United States Patent
de Almeida et al.

(10) Patent No.: US 7,184,632 B2
(45) Date of Patent: Feb. 27, 2007

(54) LIGHT SCATTERING OPTICAL RESONATOR

(75) Inventors: Vilson Rosa de Almeida, Ithaca, NY (US); Carlos Angulo Barrios, Ithaca, NY (US); Roberto R. Panepucci, Ithaca, NY (US); Michal Lipson, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 187 days.

(21) Appl. No.: 10/745,833

(22) Filed: Dec. 22, 2003

(65) Prior Publication Data

US 2004/0240782 A1    Dec. 2, 2004

Related U.S. Application Data

(60) Provisional application No. 60/473,845, filed on May 27, 2003.

(51) Int. Cl.
G02B 6/42    (2006.01)
G02B 6/00    (2006.01)

(52) U.S. Cl. ............................................ 385/50; 385/39
(58) Field of Classification Search ...................... None
See application file for complete search history.

(56) References Cited

U.S. PATENT DOCUMENTS

| | | | | |
|---|---|---|---|---|
| 4,067,641 A | * | 1/1978 | Holton | ........................ 385/131 |
| 4,743,083 A | * | 5/1988 | Schimpe | ....................... 385/37 |
| 5,274,720 A | * | 12/1993 | Yamamoto | ................... 385/129 |
| 5,995,288 A | | 11/1999 | Kashima et al. | ............ 359/599 |
| 6,741,228 B1 | * | 5/2004 | Yokoyama et al. | ........... 345/76 |
| 6,794,687 B1 | * | 9/2004 | Kurahashi et al. | ............ 257/98 |
| 2002/0081055 A1 | | 6/2002 | Painter et al. | ................. 385/2 |

FOREIGN PATENT DOCUMENTS

WO    WO-0163336 A1    8/2001
WO    WO-2004/107032 A1    12/2004

OTHER PUBLICATIONS

"Kodak Display Products: Passive Displays", http://web.archive.org/web/20021022010701/http://www.kodak.com/US/en/corp/display/passiveDisplays.jhtml (archived Oct. 22, 2002), 2 pages.

(Continued)

*Primary Examiner*—Sung Pak
(74) *Attorney, Agent, or Firm*—Schwegman, Lundberg, Woessner & Kluth, P.A.

(57) ABSTRACT

Ring or disc optical resonators are provided with random or coherent corrugation on a top surface to cause optical power to be radiated in a desired direction by light scattering. The resonators may be positioned proximate a waveguide, either in-plane or inter-plane with the waveguide. The resonators are used in a polymeric photonic display. Light at each fundamental color is generated by light emitting diodes, such as organic light emitting diodes (OLEDs). The light is coupled into waveguides that cross an array of diffractive elements, such as the resonators, each combined with an optical modulator, such as a polymer electro-optic (EO) modulator. The modulator allows light from the waveguides to reach the diffractive elements. Control lines run across the waveguides, and provide control signals to the modulators, allowing one row of diffractive elements at a time to receive light from the waveguides. The rows are scanned and synchronized with light generated by the OLEDs.

7 Claims, 8 Drawing Sheets

OTHER PUBLICATIONS

Absil, P. P., et al., "Compact Microring Notch Filters", *IEEE Photonics Technology Letters, 12*(4), (2000), 398-400.

Ahn, S. W., et al., "Polymeric digital optical modulator based on asymmetric branch", *Electronics Letters 37*(3), (2001), 172-174.

Almeida, V. R., et al., "Nanotaper for compact mode conversion", *Optics Letters, 28*(15), (2003), 1302-1304.

Bach, L., et al., "Wavelength Stabilized Single-Mode Lasers by Coupled Micro-Square Resonators", *IEEE Photonics Technology Letters, 15*(3), (2003), 377-379.

Djordjev, K., et al., "Study of the Effects of the Geometry on the Performance of Vertically Coupled InP Microdisk Resonators", *Journal of Lightwave Technology, 20*(8), (2002), 1485-1492.

Eldada, L., et al., "Advances in Polymer Integrated Optics", *IEEE Journal of Selected Topics in Quantum Electronics, 6*(1), (2000), 54-68.

Kang, J.-W., et al., "Low-Loss and Thermally Stable TE-Mode Selective Polymer Waveguide Using Photosensitive Fluorinated Polyimide", *IEEE Photonics Technology Letters, 14*(9), (2002), 1297-1299.

Klunder, D. J., et al., "Minimized Losses in a Cylindrical Microresonator by Use of a Cladding: Experimental and Numerical Study", *Proceedings of the Fourteenth Annual Meeting of the IEEE Lasers & Electro-Optics Society*, vol. 1, (Nov. 14, 2001),582-583.

Leadbeater, M., "Polymers Shine the Light", *SPIE's OE Magazine*, (Jun. 2002), 14-17.

Little, B. E., et al., "Microring Resonator Channel Dropping Filters", *Journal of Lightwave Technology, 15*(6), (1997), 998-1005.

Little, B. E., et al., "Second-order filtering and sensing with partially coupled traveling waves in a single resonator", *Optics Letters, 23*(20), (1998), 1570-1572.

Rabiei, P., et al., "Polymer Micro-Ring Filters and Modulators", *Journal of Lightwave Technology, 20*(11), (2002), 1968-1975.

Rafizadeh, D., et al., "Waveguide-coupled AlGaAs/GaAs microcavity ring and disk resonators with high finesse and 21.6-nm free spectral range", *Optics Letters, 22*(16), (1997), 1244-1249.

Rhee, J., et al., "Patterning organic light-emitting diodes by cathode transfer", *Applied Physics Letters, 81*(22), (2002), 4165-4167.

Robinson, G., "Materials Shape the World", *EE Times*, http://www.eetimes.com/story/OEG20020423S0061, (Apr. 2002), 3 pages.

Taillaert, D., et al., "An out-of-plane grating coupler for efficient butt-coupling between compact planar waveguides and single-mode fibers", *IEEE Journal of Quantum Electronics, 38*(7), (2002), 949-955.

Xie, X., et al., "Linearized Mach-Zehnder Intensity Modulator", *IEEE Photonics Technology Letters, 15*(4), (2003), 531-533.

Xu, Y., et al., "Scattering-theory analysis of waveguide-resonator coupling", *Physical Reviews, 62*(5), (2000), 7389-7404.

Yariv, A., "Universal relations for coupling of optical power between microresonators and dielectric waveguides", *Electronics Letters, 36*(4), (2000), ,321-322.

\* cited by examiner

LIGHT SCATTERING OPTICAL RESONATOR

CROSS-REFERENCE TO RELATED APPLICATIONS

This application claims the benefit of U.S. Provisional Application No. 60/473,845, filed on May 27, 2003, under 35 U.S.C. § 119(e), which application is incorporated herein by reference.

FIELD OF THE INVENTION

The present invention relates to light scattering, and in particular to light scattering using an optical resonator.

BACKGROUND OF THE INVENTION

Organic light-emitting diode (OLED) technology is attracting considerable attention in the display industry. The technology enables the production of thin, light-emitting displays that can handle moving pictures. OLED displays could one day take the place of liquid crystal displays (LCDs) in many of the situations that require flat-panel displays. OLEDs are not well suited for forming large area displays due to power requirements. In particular, the contribution from the metal or other wiring to the total dissipated power increases significantly as the size of the display (passive-matrix display) is increased. The wiring problem can be overcome by using active-matrix displays, however they require a polysilicon substrate for the drive circuitry, which makes them mechanically rigid and not suitable for applications where flexibility and easy handle are required. In addition, large OLEDs are needed for large displays, which require more driving power and present much shorter lifetime.

SUMMARY OF THE INVENTION

Ring or disc optical resonators are provided with random or coherent corrugation on a top surface to cause optical power to be radiated in a desired direction by light scattering. In one embodiment, such resonators are positioned proximate a waveguide, either in-plane or inter-plane with the waveguide.

In a further embodiment, the resonator radiates optical power in a desired frequency range. The frequency range is obtained using appropriate choice of resonator dimensions, surface roughness properties, and gap between the waveguide and resonator. Red, green and blue resonators may be combined to form a display pixel element.

In one embodiment, the resonators are used in a polymeric photonic display. Light at each fundamental color is generated by light emitting diodes, such as organic light-emitting diodes (OLEDs). The light is coupled into waveguides that cross an array of diffractive elements, such as the resonators combined with an optical modulator, such as a polymer electro-optic (EO) modulator. The modulator allows light from the waveguides to reach the diffractive elements. Control lines run across the waveguides, and provide control signals to the modulators, allowing one row of diffractive elements at a time to receive light from the waveguides. The rows are scanned and synchronized with light generated by the OLEDs, to form a display screen.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
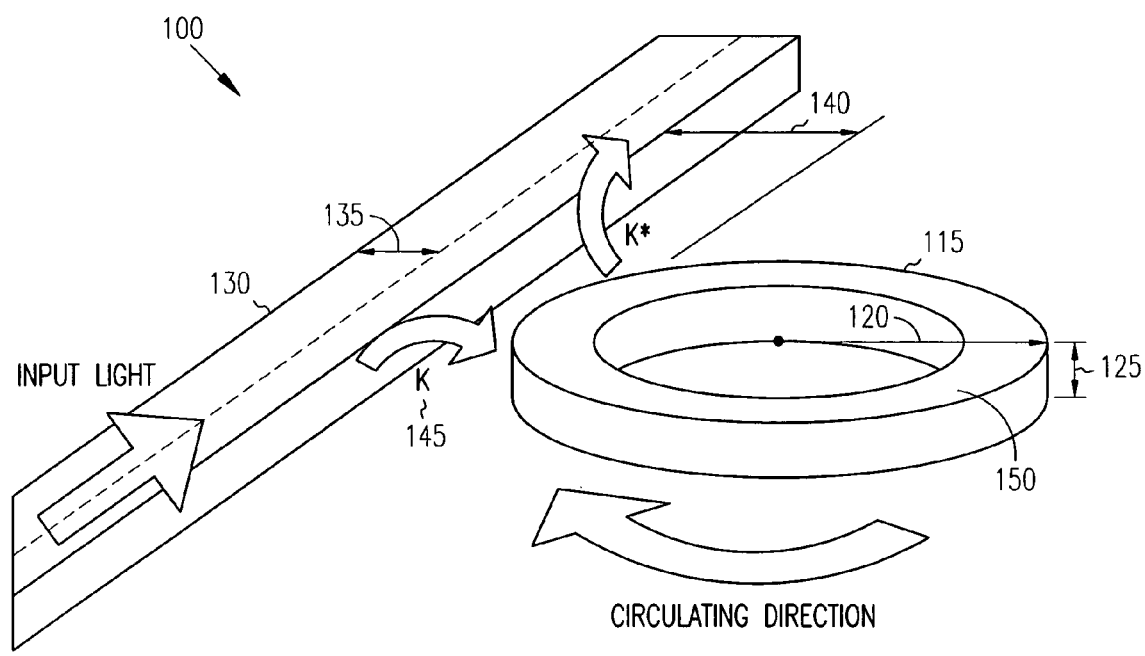
FIG. 1 is a perspective representation of a ring resonator critically coupled to a waveguide.

In FIG. 1, generally at 100, a single-coupled ring resonator 115 is shown. The ring resonator 115 has a radius, r, at 120, and height, h, indicated at 125. The ring resonator 115 is coupled to a waveguide 130 having a width 135. The ring resonator 115 and waveguide 130 are coupled over a gap, g, indicated at 140. A coupling coefficient, k, is indicated at 145, and represents the fraction of the electric field that is coupled between the waveguide 130 and ring resonator 115.

When substantially the total optical power from the waveguide is extracted by the ring resonator, a condition called critical coupling occurs. The optical power from the waveguide is then converted into the form of energy correspondent to the mechanism responsible for the optical losses inside the ring resonator 115. The ring resonator is formed to cause the optical power to be radiated in substantially in an upward direction via light scattering by providing random or coherent corrugation on a top surface 150 of the ring resonator 115. However, the scattering efficiency depends in an intricate way upon the final corrugation properties, bending and absorption losses, as well as the geometric properties of the waveguide-ring/disc structure.

In one embodiment, the single coupled ring resonator and waveguide are formed on a Silicon-On-Insulator (SOI) substrate, with waveguide 130 and ring resonator 115 patterned on a top-silicon layer ($n_{Si}$=3.48 at $\lambda_0$=1.55 µm). E-beam lithography and plasma etching may be employed in the fabrication process. A $SiO_2$ cladding is deposited over all structures with a same thickness of approximately 3 µm as a buried-oxide (BOX) layer. The fabrication parameters are w=450 nm, h=250 nm, r=10 µm. The gap 140 may have a varied range of g (150, 200, 300 and 400 nm). It should be noted that the structures may be formed using many different processes, and the sizes and composition of the structures may be varied significantly. Nano-taper mode converters are optionally provided on both longitudinal edges of the waveguide in order to increase optical coupling efficiency.

Roughness may be obtained by embossing, ion-bombardment or etching. The corrugation, also called coherent roughness profiles can be obtained by: e-beam lithography or photolithography followed by etch; or embossing.

In one embodiment, the respective cross sections of the ring resonator 115 and waveguide 130 are approximately the same. Resonances in the ring resonator occur when the following condition is satisfied, $$\frac{\text{Re}[n_{eff}(\lambda_0)] \cdot L}{\lambda_0} = m, m \in Z, \tag{1}$$

where $n_{eff}$ is the complex effective index of the lossy eigenmode guided in the ring resonator, $\lambda_0$ is the free-space wavelength, L=2π·r is the ring resonator perimeter, and Re[ ] denotes the real part of a complex quantity.

Neglecting reflected light coupled back into the waveguide, the optical power transmittivity (T) at resonances is given by $$T = \left( \frac{e^{-\alpha \cdot L} - \sqrt{1-|\kappa|^2}}{1 - e^{-\alpha \cdot L} \cdot \sqrt{1-|\kappa|^2}} \right)^2, \tag{2}$$

where α is the total field loss coefficient in the waveguide, alternatively expressed as $$\alpha(\lambda_0) = \frac{2\pi}{\lambda_0} \cdot \text{Im}[n_{eff}(\lambda_0)], \tag{3}$$

where Im[ ] denotes the imaginary part of a complex quantity. In (2), the dependences of T, α and κ on the free-space wavelength were omitted by simplicity of notation, but are of foremost importance for an accurate description of the device behavior. The total field loss coefficient α corresponds to the additive contribution of all loss mechanisms, such as material loss ($\alpha_m$), bending loss ($\alpha_b$), and scattering loss due to surface corrugations ($\alpha_{sc}$). It is worth noting that $\alpha_{sc}$ depends upon geometric parameters of the ring/disc resonator, such as the bending radius r. The total field loss coefficient a relates to the most widely adopted total optical power loss coefficient ($\alpha_P$) through the simple relationship $$\alpha_P = 2 \cdot \alpha, \tag{4}$$

where $\alpha_P$ is usually expressed in units of dB/cm.

The critical coupling condition (T=0) is attained when the following relationship is satisfied, $$e^{-\alpha \cdot L} = \sqrt{1-|\kappa|^2}. \tag{5}$$

The quality-factor (Q) of a single-coupled ring resonator is approximately given by $$Q \cong \frac{\lambda_0}{\Delta \lambda_{FWHM}} \cong \frac{\pi \cdot \sqrt{e^{-\alpha \cdot L} \cdot \sqrt{1-|\kappa|^2}} \cdot L \cdot n_g}{\left(1 - e^{-\alpha \cdot L} \cdot \sqrt{1-|\kappa|^2}\right) \cdot \lambda_0}, \tag{6}$$

where $\Delta \lambda_{FWHM}$ is the Full-Width-at-Half-Maximum (FWHM) resonance bandwidth, and $n_g$ is the group index of light guided in the ring resonator. The dependences of Q, α, κ, and $n_g$ on the free-space wavelength were again omitted by simplicity of notation. The group index is defined as $$n_g(\lambda_0) = \text{Re}\left[n_{eff}(\lambda_0) - \lambda_0 \cdot \frac{\partial n_{eff}(\lambda_0)}{\partial \lambda_0}\right]. \tag{7}$$

Under critical coupling condition, eq. (6) is reduced to $$Q \cong \frac{\lambda_0}{\Delta \lambda_{FWHM}} \cong \frac{\pi \cdot e^{-\alpha \cdot L} \cdot L \cdot \text{Re}[n_g]}{(1 - e^{-2 \cdot \alpha \cdot L}) \cdot \lambda_0}. \tag{8}$$

The Free Spectral Range (FSR) is defined as the wavelength difference between two adjacent resonances. It is straightforward to obtain an approximate estimate for the real part of the group index at the resonance wavelength of interest by making use of the average FSR. This approximation is given by $$\text{Re}[n_g] \cong \frac{\lambda_0^2}{\left(\frac{FSR_L + FSR_R}{2}\right) \cdot L} = 3.08, \tag{9}$$

where $FSR_L$ and $FSR_R$ are the FSR to shorter and longer adjacent resonance wavelengths, respectively, with respect to the resonance of interest.

Rewriting eq. (8) in terms of a and substituting the analytical expression in (9) leads to $$(e^{\alpha \cdot L} - e^{-\alpha \cdot L}) \cong \frac{\pi \cdot \Delta \lambda_{FWHM}}{\left(\frac{FSR_L + FSR_R}{2}\right)}. \tag{10}$$

If the term α·L is small such that the approximation $$e^{\alpha \cdot L} \cong 1 + \alpha \cdot L \tag{11}$$

is valid, then (10) reduces to $$\alpha \cong \frac{\pi \cdot \Delta\lambda_{FWHM}}{L \cdot (FSR_L + FSR_R)}, \quad (12)$$

and (4) becomes $$\alpha_P \cong [0.2 \cdot \log(e) \cdot \pi] \cdot \frac{\Delta\lambda_{FWHM}}{L \cdot (FSR_L + FSR_R)} \cong 0.273 \cdot \frac{\Delta\lambda_{FWHM}}{L \cdot (FSR_L + FSR_R)}, \quad (13)$$

in units of dB/cm, with the reminder that the wavelengths in are given in meters. The constant e in (13) is the natural logarithm base.

Figure 2:
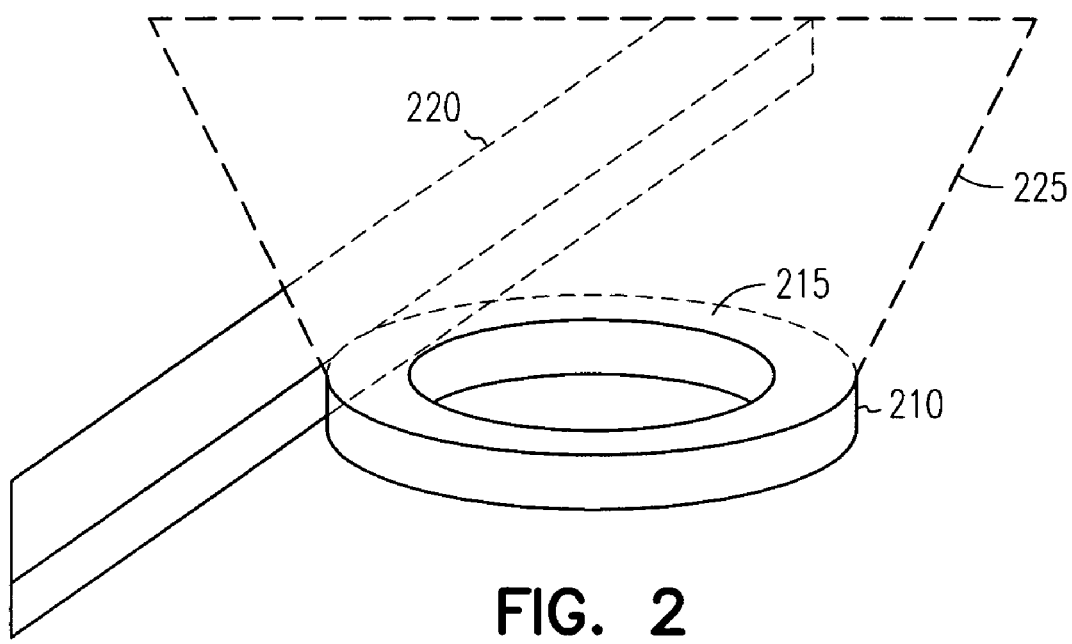
FIG. 2 is a perspective representation of a ring resonator adjacent a waveguide in the same plane as the ring resonator.
Figure 3:
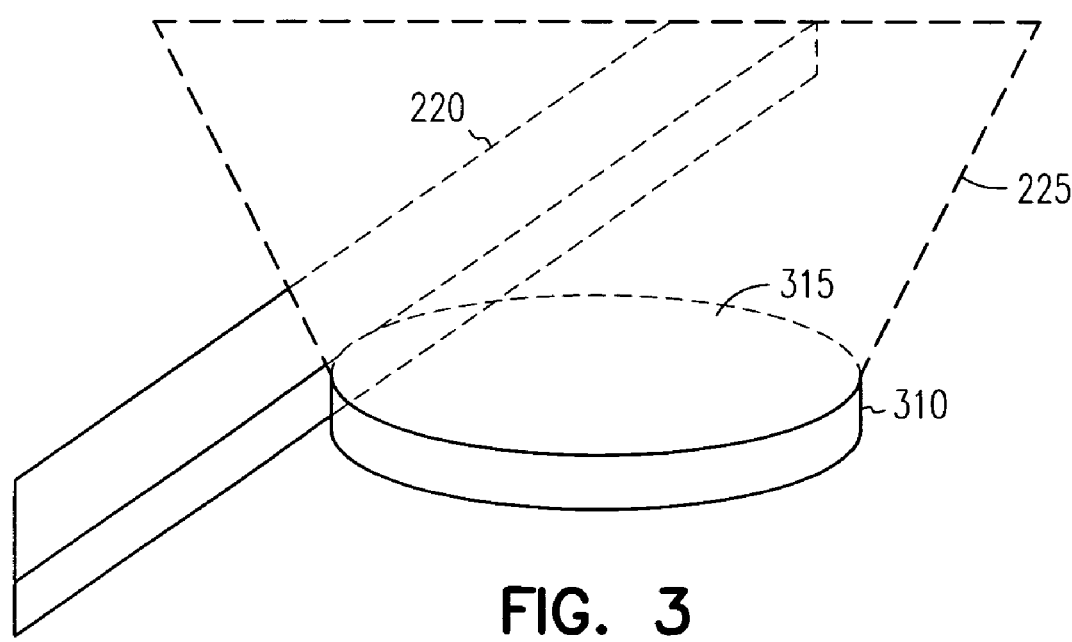
FIG. 3 is a perspective representation of a disc resonator adjacent a waveguide in the same plane as the ring resonator.
Figure 4:
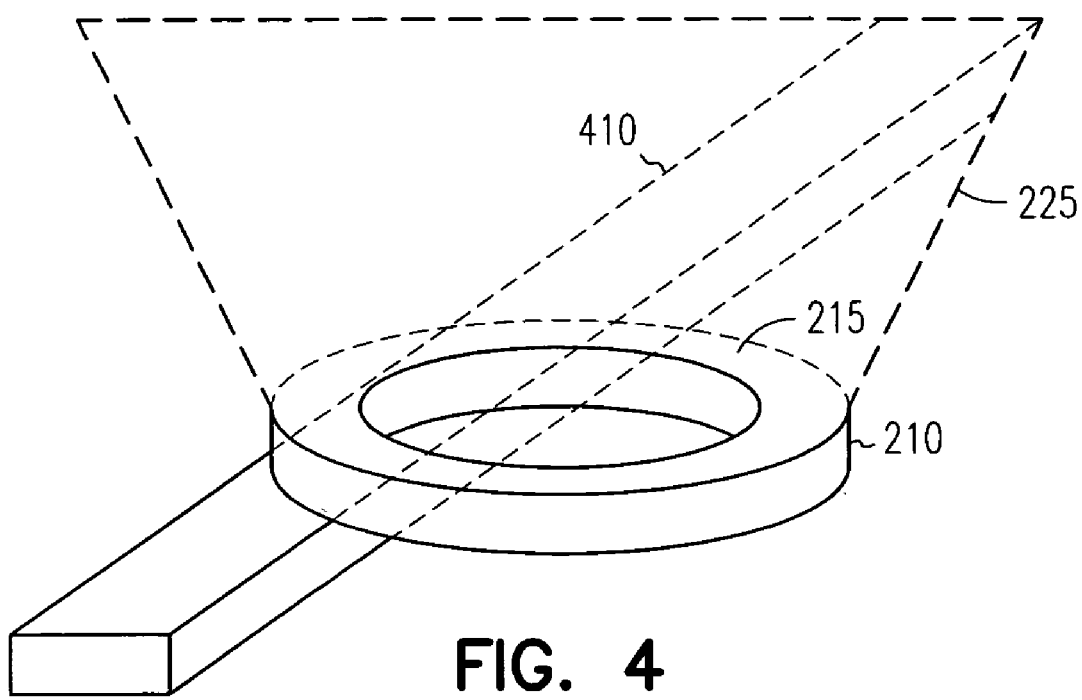
FIG. 4 is a perspective representation of a ring resonator adjacent a waveguide in a different plane than the ring resonator.
Figure 5:
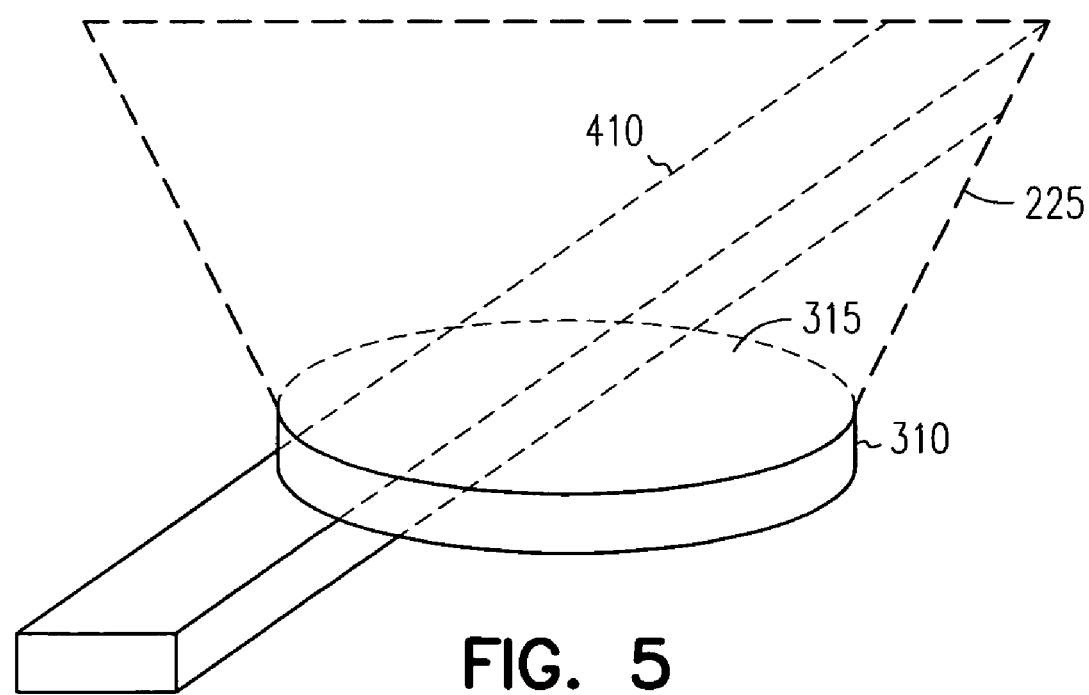
FIG. 5 is a perspective representation of a disc resonator adjacent a waveguide in a different plane than the disc resonator.
Figure 6A:
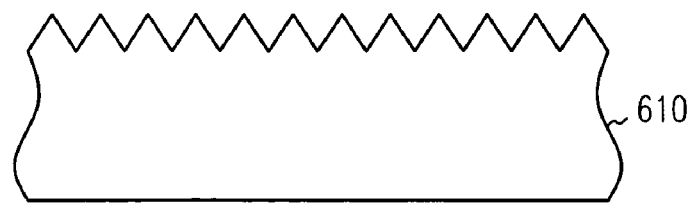
FIG. 6 is a diagram representing corrugation of a surface of four different resonators.
Figure 6B:
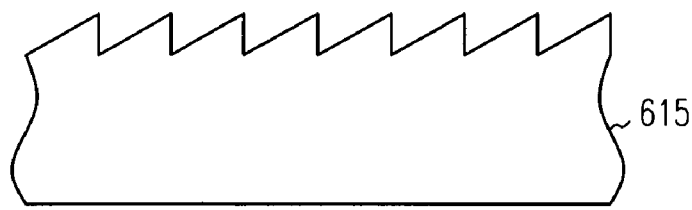
Figure 6C:
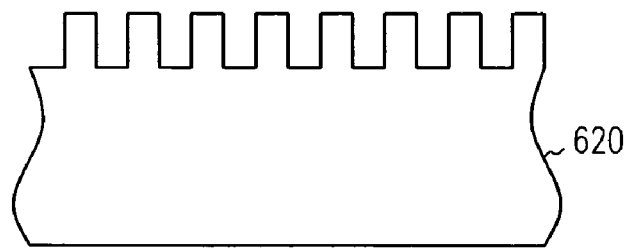
Figure 6D:
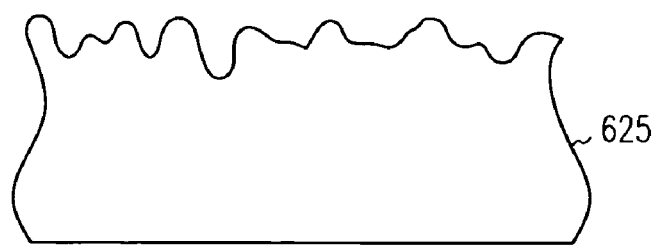

FIGS. 2, 3, 4 and 5 also show that coupling between waveguide and resonator may either be in-plane (FIGS. 2 and 3) (waveguide and resonator side-by-side in the same plane) or inter-plane (FIGS. 4 and 5) (resonator in a different plane than that of the waveguide). In FIG. 2 a ring resonator 210 having a corrugated surface 215 is in the same plane as a waveguide 220. Light is indicated at 225 as being scattered in an upward direction. In FIG. 3, a disc resonator 310 has similar properties to a similarly dimensioned ring resonator. Disc resonator 310 has a corrugated surface 315 and is coupled to waveguide 220, which is in the same plane as disc resonator 310. In FIG. 4, a waveguide 410 is indicated in a plane adjacent to ring resonator 210. In FIG. 5, waveguide 410 is in a plane adjacent to disc resonator 310. In interplane embodiments, the planes may be directly adjacent, or adjacent by separated by a desired amount, as long as sufficient coupling is achieved.

FIG. 6 is a diagram representing four different corrugations of a surface of a resonator. Other corrugations may also be created. One corrugation is shown at 610, a symmetrical triangle shape characteristics. Corrugation at 615 has characteristics more like an asymmetrical saw tooth shape corrugation. At 620, the corrugation is rectangular in shape, while at 625, the corrugation is somewhat random in both height and width. The characteristics are in general may be obtained by numerical simulations and depend upon application. For display pixels, the random corrugation 625 may be more appropriate owing to non-preferential directionality, but the amplitude and spatial spectral properties of the roughness are relevant to the overall performance of the ring in light scattering. The saw-tooth profile seems to be more appropriate for directional out-of-plane scattering, but is hard to fabricate. It can be partially replaced by the triangular or square roughness with appropriate dimensions. The random roughness can be obtained by embossing, ion-bombardment or etching. The other (coherent) profiles can be obtained by: e-beam lithography or photolithography followed by etch; or embossing.

Figure 7:
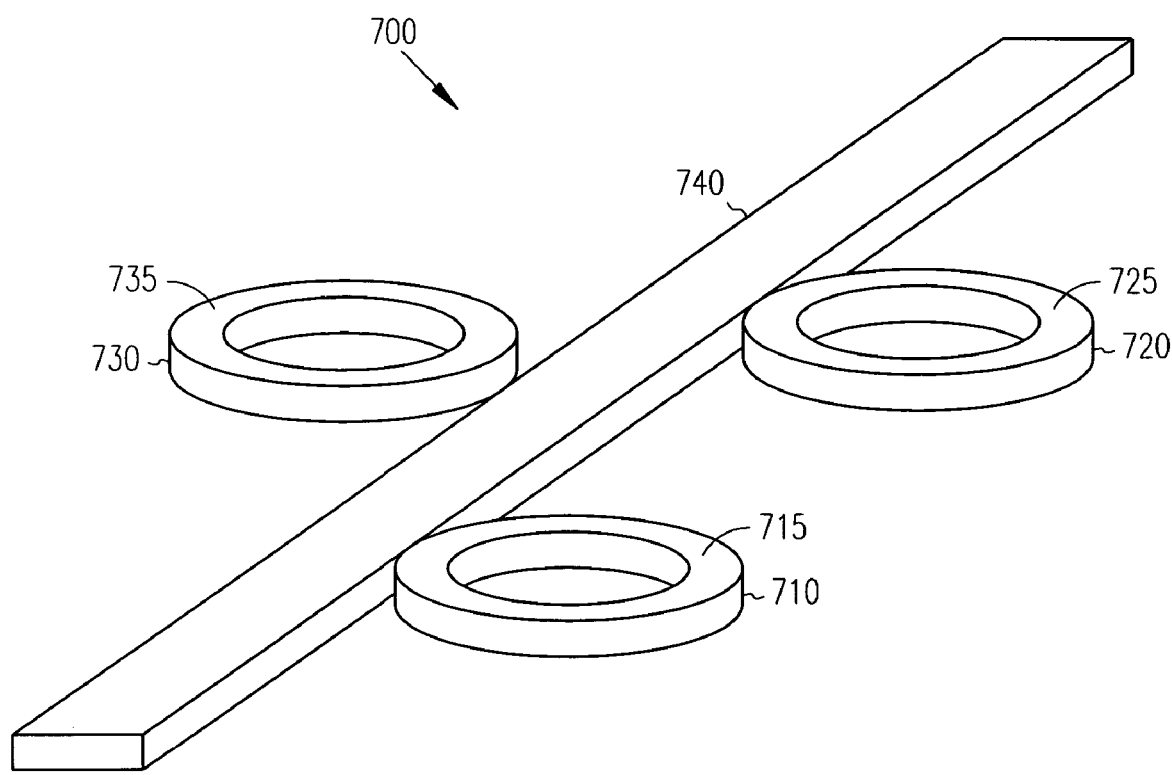
FIG. 7 is a diagram of three resonators, each emitting a different color of light, and each coupled to a waveguide.

A color pixel element is shown generally at 700 in FIG. 7. Random corrugation (roughness) is intentionally made strong on the top-surface of multiple resonators, 710, 720 and 730. Such corrugation provides scattering that is efficiently radiated over a wide angle of directions. The arrangement shown is compact, with two resonators on one side of the waveguide 740, and another on the opposite side, somewhat between the two other resonators. Other arrangements may also be used, such as all the resonators being lined up on the same side of the waveguide.

A range of the visible spectrum radiated for each resonator is controlled through appropriate choice of resonator dimensions, roughness properties, and gap between the waveguide 740 and resonator. Under critical coupling conditions, resonator 710 emits red light 715, resonator 720 emits green light 725 and resonator 730 emits blue light 735.

From the equations above, it is possible to obtain efficient scattering only for a certain range of wavelengths (or frequencies) which correspond to different colors in the visible range. The parameter that needs to be tuned is the roughness (basically its amplitude). Therefore, the microfabrication processes are calibrated in one embodiment (by ranging fabrication parameters around an initial guess) in order to obtain efficient scattering for each color. Calibration of microfabrication processes are the common approach to fine-tune many microdevice properties in practice. Once known, the repeatability of the process is usually very accurate.

Figure 8:
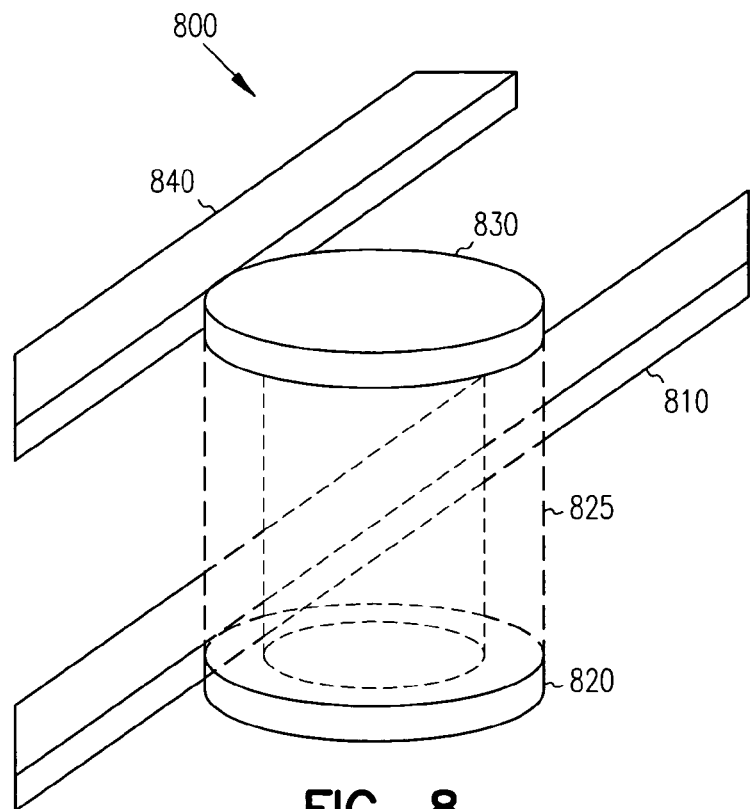
FIG. 8 is a block diagram of a display device utilizing resonators.
Figure 9:
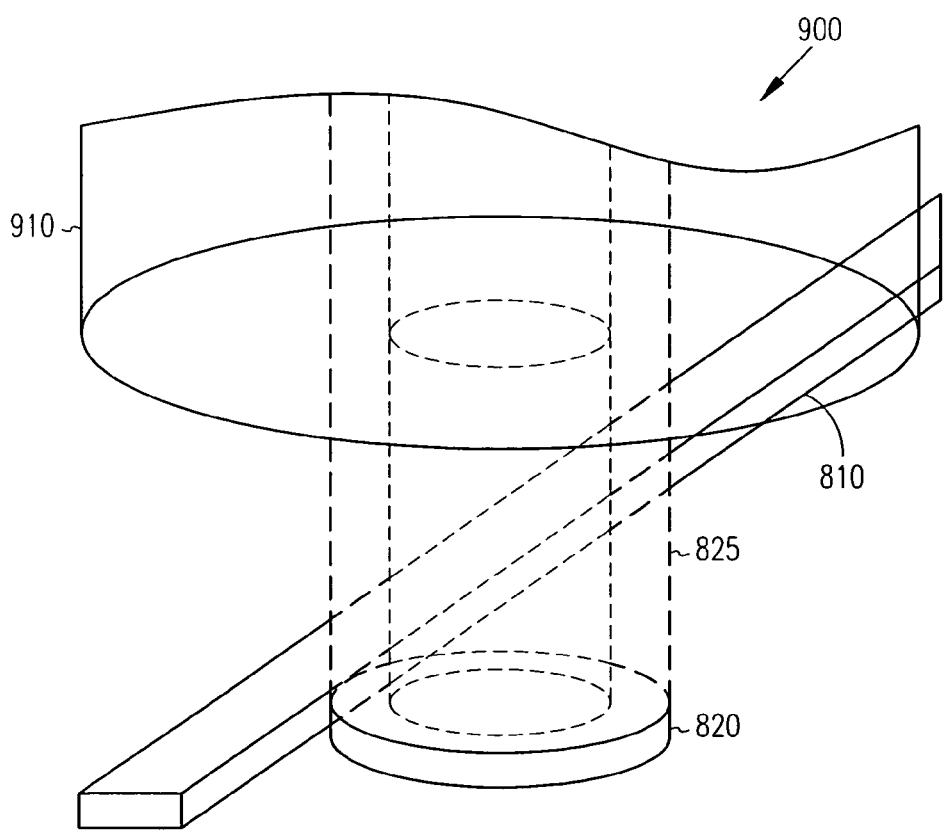
FIG. 9 is a block diagram of an LED coupled to a waveguide in the display of FIG. 8.

Out-of-plane coupling is achieved using structures 800 and 900 in FIGS. 8 and 9. In FIG. 8, a waveguide 810 is coupled to a disc resonator 820, which scatters light 825 toward a second, receiver disc resonator 830. Resonator 830 is coupled to a waveguide 840, and transfers optical power received to waveguide 840, effectively providing interlayer planar waveguide coupling. Many layers of planar optical integrated circuits may be stacked on the same chip.

In FIG. 9, an optical fiber 910 is positioned to receive light 825 scattered from disc resonator 820. Thus, waveguide 810 is effectively coupled to optical fiber, providing for dense coupling between planar optical integrated circuits and external waveguides and circuits. Additionally, the out-of-plane coupling can be employed for directing optical radiation to specific devices in an optical chip, such as photodetectors positioned either above or under the ring/disc resonator plane. Appropriate random or coherent corrugation on the top and/or bottom surfaces are provided to obtain desired directionally controlled light scattering.

Figure 10:
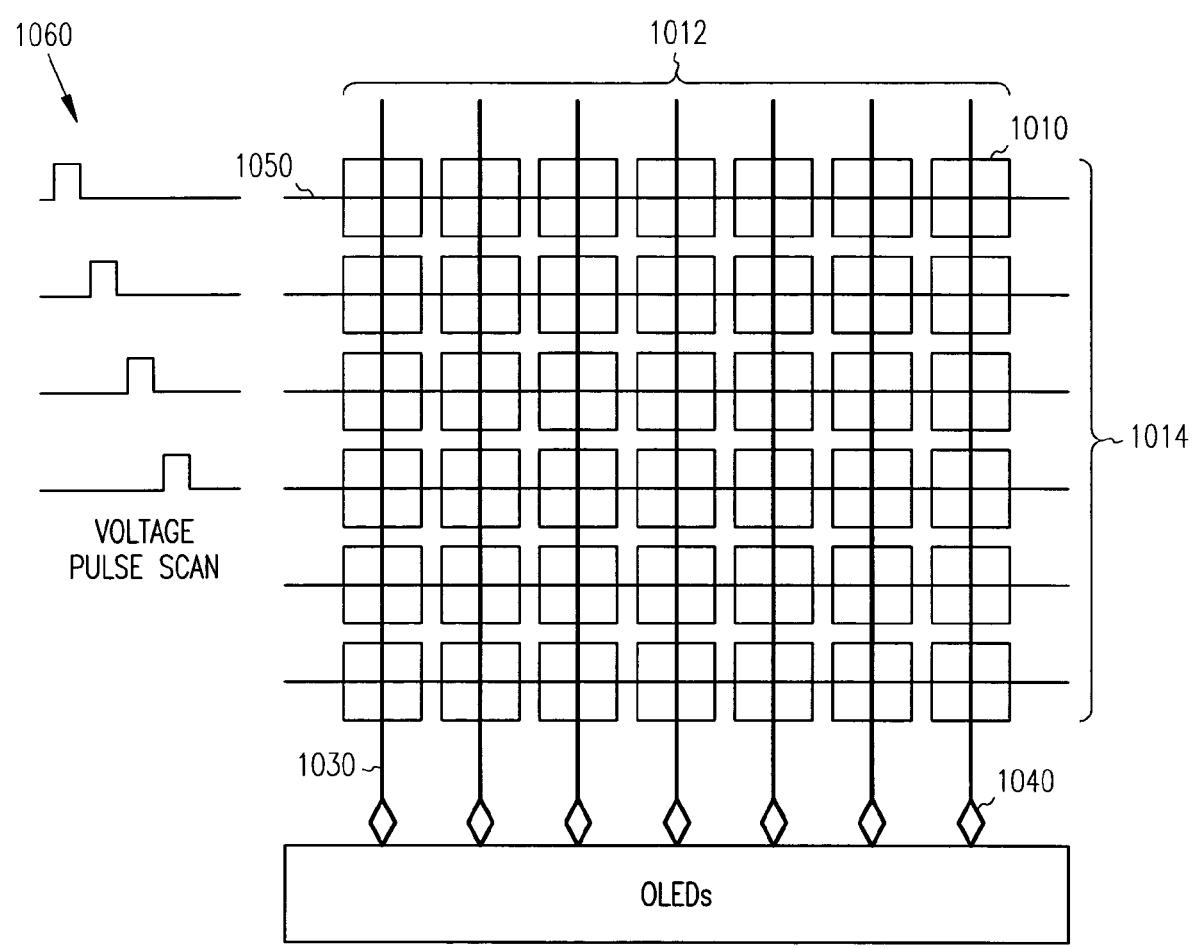
FIG. 10 is a block diagram of a pixel element of the display device of FIG. 8.

FIG. 10 shows a schematic of the proposed polymeric photonic display (PPD) 1000, which utilizes an array of trios of single coupled ring or disc resonators providing light scattering of different colors, such as fundamental colors red, green and blue. Each trio effectively provides light of different color for a pixel 1010. N×N pixels 1010 comprise the display 1010. The display has N columns 1012 and N rows 1014. Light at each fundamental color is generated by OLEDs 1020 on one side of the display.

Figure 11:
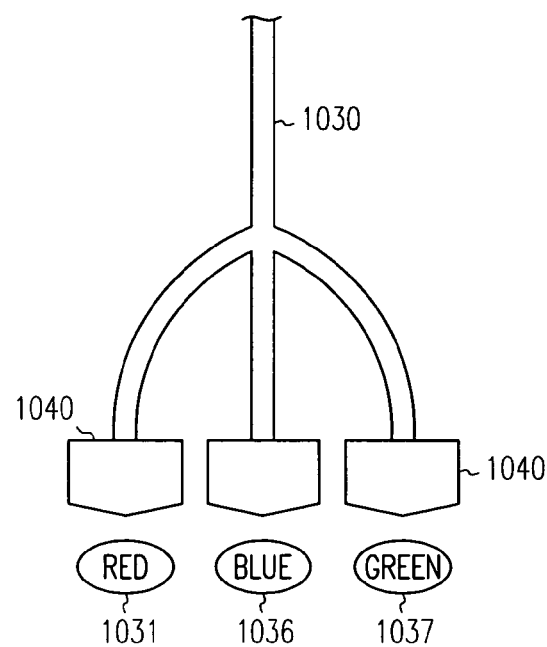
FIG. 11 is a diagram representing multiple organic LEDs coupled into polymeric waveguides according to an example embodiment.

The OLEDs are coupled into polymeric waveguides 1030 which cross the display in one direction. Each OLED comprises three OLEDs 1035 (red), 1036 (green) and 1037 (blue) as shown in FIG. 11, each coupling into a waveguide 1030 via couplers 1040 to provide different color light.

Figure 12:
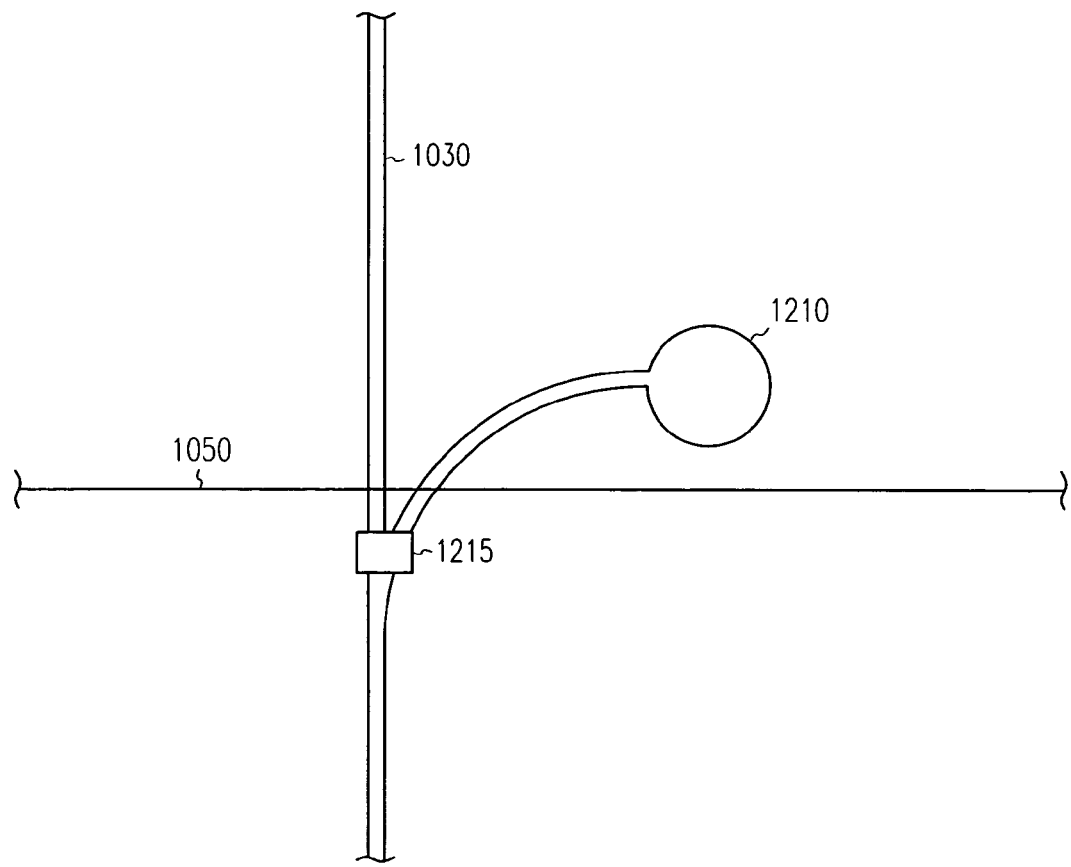
FIG. 12 is a diagram representing a diffractive element coupled to a polymer electro-optic (EO) modulator according to an example embodiment.

Each pixel 1010 is formed by a diffractive element 1210 as shown in FIG. 12, and a polymer electro-optic (EO) modulator 1215. The diffractive element 1210 scatters (spreads) light in all directions acting as a light source. The EO modulator 1215 selectively allows light from the waveguide to reach the diffractive element. EO modulators may also be associated on a row or column basis as desired in different embodiments, or even with portions of rows or columns. A plurality of transmission lines 1050 are coupled to the EO modulators 1215. Each transmission line is used to control all the EO modulators 1215 along a row 1014 of pixel elements in one embodiment.

A video output is displayed on the panel by scanning through all the rows successively in a frame time (typically 1/60 second), that is, by switching each row on after the previous one has been switched off. A series of voltage pulses are shown at 1060 to provide a control signal to each EO modulator, effectively turning pixel elements on and off on a row basis. The OLEDs are synchronized with the scanning to provide the appropriate colors along the waveguides for the pixels in each row during the scan.

Power dissipation in such a display is due mostly to power consumed by the OLEDs as the display size increases. Losses in polymeric waveguides is likely very low (<0.01 dB/cm).

One or more benefits may be obtained in various embodiments of the invention. Such benefits depend on many different parameters and may not be present in every embodiment. Lower power dissipation may be obtained compared to a passive matrix OLED display. The displays are also mechanically flexible as compared to an active matrix display that uses a polysilicon substrate. Reliability may be enhanced due to the use of a lower number of OLEDs. By the same token, maintenance of such a display may be easier since it is easier to replace OLEDs in one side out of the display than inside the 2D matrix. No large arrays of OLEDs are necessary as the display size increases. While the number of modulators may increase, they are easier to fabricate than OLEDs. The use of smaller and fewer OLEDs decrease the probability of failure of the display.

In alternative embodiment, different light sources than OLEDs may be utilized to obtain the desired colors. Different color light emitting diodes may be used, as well as different filters coupling a light source. Different types of modulators may also be used as desired, and the waveguides may be made of different materials, as may the transmission lines. Optical modulators may be used in place of the EO modulators.

The invention claimed is:

1. A display screen comprising:
   an array of groups of resonators having surface corrugation to cause light to be scattered in an upward direction, each group having resonators formed to emit different color light;
   a plurality of waveguides optically coupled to a column of groups of resonators in the array;
   each group of resonators having a modulator positioned between the group and a corresponding waveguide; and
   a plurality of control lines, each control line coupled to a row of modulators to control the modulators to control optical coupling of the groups of resonators with the waveguides.

2. The display screen of claim 1 wherein the corrugated surface is random.

3. The display screen of claim 1 wherein the corrugated surface is coherent.

4. The display screen of claim 1 wherein the optical coupling is in-plane.

5. The display screen of claim 1 wherein the optical coupling is inter-plane.

6. The display screen of claim 1 wherein a suitable set of resonators from the plurality of resonators is positioned to form red, green and blue resonator-pixels.

7. A display screen comprising:
   an array of groups of resonators having surface corrugation to cause light to be scattered in an upward direction, each group having resonators formed to emit different color light;
   a plurality of waveguides optically coupled to a column of groups of resonators in the array;
   each group of resonators associated with a modulator and a corresponding waveguide; and
   means for controlling the modulators to control optical coupling of the groups of resonators with the waveguides.

* * * * *